July 22, 1969     F. S. KLEIN ET AL     3,457,041
METHOD FOR THE ENRICHMENT OF DEUTERIUM
Original Filed Aug. 7, 1962
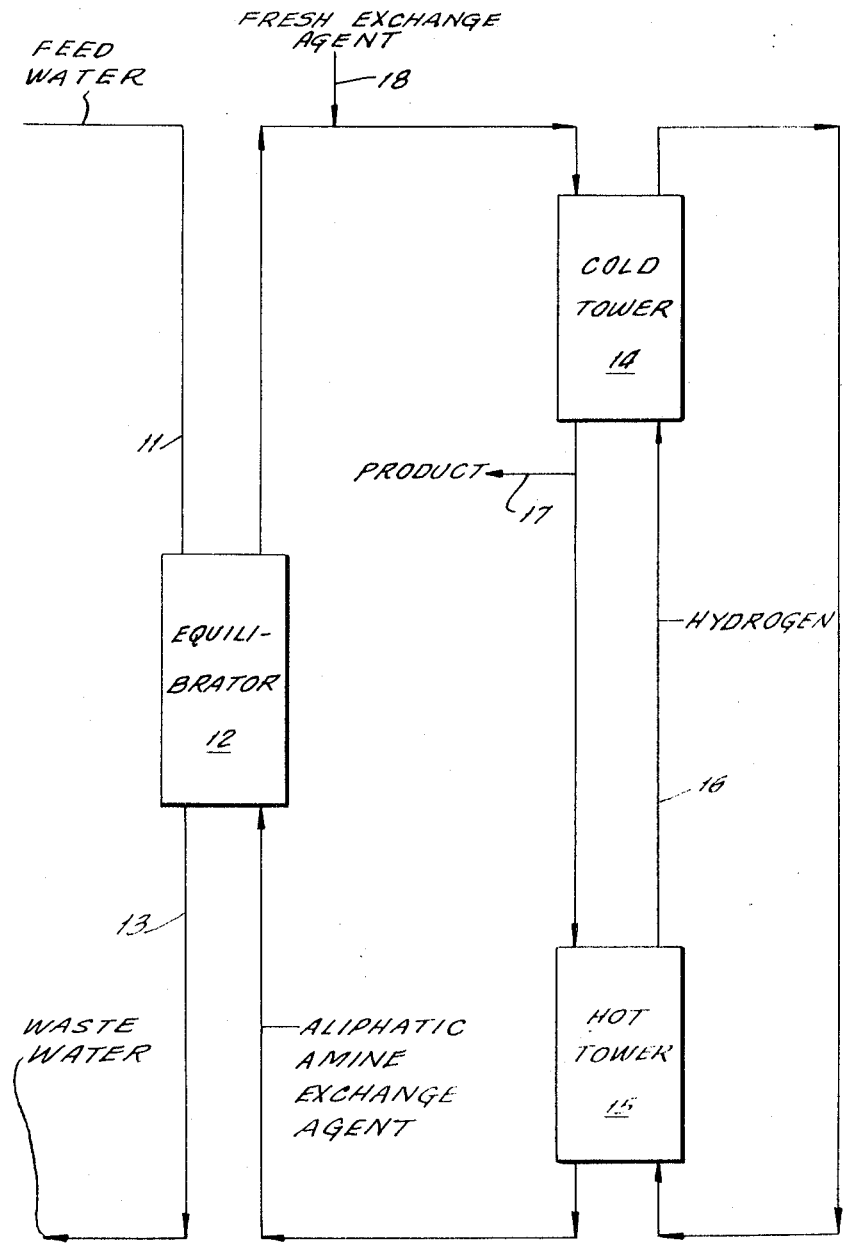
INVENTORS
FRITZ KLEIN
KEDMA BAR-ELI
BY
OSTROLENK, FABER GERB & SOFFEN
ATTORNEYS United States Patent Office 3,457,041
Patented July 22, 1969

3,457,041
METHOD FOR THE ENRICHMENT OF DEUTERIUM
Fritz S. Klein and Kedma Bar-Eli, Rehovoth, Israel, assignors to Yeda Research and Development Co., Ltd., Rehovoth, Israel, a company of Israel
Continuation of application Ser. No. 215,371, Aug. 7, 1962. This application May 11, 1967, Ser. No. 637,846
Claims priority, application Israel, Aug. 25, 1961, 15,941
Int. Cl. C01b *4/00, 5/02*
U.S. Cl. 23—204                                8 Claims This application is a continuation of Ser. No. 215,371, filed Aug. 7, 1962, now abandoned.

The present invention relates to a process for affecting the isotopic enrichment of deuterium by bi-thermal exchange.

The isotopic enrichment by bi-thermal isotopic exchange has been used for a number of years in the enrichment of ammonia in deuterium. The process has been described in Proceedings of the International Symposium on Isotope Separation, Amsterdam (1957), in Atomic Energy Comission (U.S.) Research & Development Report HFK–113 of Sept. 4, 1951, and in M. Benedict and Th. Pigford: Nuclear Chemical Engineering, McGraw-Hill (1957).

In the conventional process use is made of a system comprising hydrogen, liquid ammonia and an alkali metal amide, which serves as catalyst.

According to the conventional method, the enrichment of deuterium is effected by contacting liquified ammonia with hydrogen in countercurrent flow in the presence of a suitable catalyst, such as an alkali metal amide, in one or more stages, in each of which the two compounds are passed through two reactors which are at different temperatures. A conventional apparatus comprises one or more bi-thermal stages in which hydrogen streams flow countercurrently to a flow of liquid ammonia, containing dissolved potassium amide as a catalyst. The hydrogen gas and the liquid pass through the low temperature stage, wherein the hydrogen is stripped of a part of the heavy hydrogen isotope (deuterium). From this tower, the hydrogen stream passes into the high-temperature stage where it is equilibrated with ammonia. Due to the different equilibrium conditions at the elevated temperature, the ammonia is stripped of part of the heavy isotope, which passes into the hydrogen stream. The stripped ammonia is recharged with the heavy isotope by equilibration with feed water in a suitable device. The desired reaction product, namely deuterium-enriched ammonia, is taken out at a point between the two towers.

A number of variations of the basic process are known. So, for example, use is being made of a number of bi-thermal stages arranged in cascades. There are also known different flow-schemes of the components, resulting in a greater efficiency of the plant.

The conventional process has a number of drawbacks. The rates of exchange between ammonia and hydrogen at low temperature are rather small. Quite substantial losses of ammonia are encountered due to the high solubility of ammonia in water during the recharging process. Furthermore, the range of working temperatures is rather small, its lower limit being the freezing point of ammonia, its upper limit being the critical temperature of the solution. Due to the pressure of ammonia at the working temperatures, expensive heavy-walled vessels and conduits must be used.

It is the object of the present invention to provide an improved process for the isotopic enrichment of deuterium by bi-thermal exchange. It is a further object of the present invention to provide a process which will result in an improved yield whenever effected in a plant of conventional dimensions. Furthermore, it is an object of the present invention to provide a process which can be carried out in a plant of smaller dimensions, resulting in equal, or even better yields than the process carried out in conventional plants. It is yet another object of the invention to provide a process which can be carried out in a considerably cheaper plant, due to lower pressures used. Other objects of the invention will become apparent hereinafter.

According to the present invention the isotopic enrichment of deuterium by bi-thermal exchange is effected in a system comprising a primary or secondary aliphatic amine, hydrogen and a substituted alkali-metal amide which serves as catalyst in this process.

The deuterium is taken up from water in an equilibrator and the waste water is discarded.

The primary or secondary aliphatic amines which are to be used as exchange agents in the process according to the present invention are of the general formula RR′NH where R is a member of the group consisting of hydrogen and lower alkyl (containing up to five carbon atoms) and R′ is lower alkyl, containing up to 5 carbon atoms. Thus there may be used lower-alkyl-amines such as methyl amine, ethylamine, propyl amine, butyl amine and amyl-amine in all the various isomeric forms as well as di-lower-alkyl amines, such as dimethyl-amine, diethyl amine and the higher homologues containing up to five carbon atoms in each alkyl substituent.

The substituted alkali metal amides which are used as catalysts in the present invention correspond to the general formula MNRR′ where M designates an alkali metal atom and where R and R′ are as defined above. Especially satisfactory results were obtained with potassium mono-alkyl amides, sodium mono-alkyl amides, lithium mono-alkyl amides and with sodium dialkyl-amides, potassium dialkyl amides and lithium dialkyl amides.

Other objects and a fuller understanding of the invention may be had by referring to the following description and claims, taken in conjunction with the accompanying drawing which shows in a purely schematical manner results obtained with the novel process in a conventional plant for the bi-thermal isotopic enrichment of deuterium.

Feed water entering through conduit 11 is equilibrated with the exchange agent, methyl-amine, in the equilibrator 12 and the waste water is discarded through conduit 13. Bi-thermal isotopic exchange and enrichment is effected in the cold tower 14 and hot tower 15 between the exchange agent and the hydrogen which is circulated in cycle 16. The enriched product is withdrawn through conduit 17 between the hot and cold tower, while a suitable quantity of exchange agent is added after the equilibrator through conduit 18. As the apparatus is of well-known conventional design, as described in greater detail in the references cited at the beginning of the specification, and as the plant as such does not form part of the invention, details of it are omitted.

In one typical operation 360 kg. moles per unit time of feed water introduced through conduit 11 and containing 296 parts per million (p.p.m.) deuterium were passed countercurrent in the equilibrator 12 to an aliphatic amine stream fed into the equilibrator at 357 kg. moles per unit time, containing 155 p.p.m. deuterium. The waste water, containing 169 p.p.m. deuterium, was discarded and the amine stream, containing 283 p.p.m. deuterium, was cycled to the isotopic exchange system in towers 14 and 15.

Additional aliphatic amine was added at the rate of 1.475 kg. moles per unit time through conduit 18 and the composite amine stream fed at the rate of 358.475 kg. moles per unit time into the cold tower 14. In the cold tower the exchange agent was passed countercurrent to a hydrogen gas stream fed through the tower at the rate of 2220 kg. moles per unit time, the hydrogen stream containing 5020 p.p.m. deuterium. 1.475 kg. moles per unit time of the enriched product, containing 31,000 p.p.m. deuterium, were removed through conduit 17 and the remainder of the exchange agent was fed to the hot tower 15 at the rate of 357 kg. moles per unit time. The hydrogen gas stream was removed from the cold tower 14 at the rate of 2220 kg. moles per unit time, the depleted stream containing only 56 p.p.m. deuterium.

The catalyst is used in form of a substantially concentrated solution in the exchange agent. The catalyst is not passed from the bottom of the hot-tower to the equilibrator, but is instead re-introduced at the top of the cold-tower, as is well-known from the design of such conventional apparatus.

The process according to the present invention can be carried out in each case in a range of temperatures and pressures which is limited only by the freezing point of the amine as the lower limit and by its critical temperature as the upper limit.

As compared with ammonia, much better rates of exchange are obtained with the novel exchange agents. It is possible to make use of considerably cheaper installations due to the lower pressures of the exchange agents used, as compared with ammonia.

The novel process is not restricted to any specific apparatus as it can be used with any installation for isotopic bi-thermal exchange.

The following further examples are given by way of illustration only:

Amongst the advantages of the novel process there may be mentioned substantially higher rates of exchange in the conventional range of working temperatures; lower losses of the exchange agent due to its lower solubility in water, compared with ammonia; as well as a wider range of working temperatures due to the inherent physical properties of the amines used.

Example 1

A bi-thermal exchange apparatus was actuated with methylamine as exchange agent and potassium methyl amide as catalyst. The rates of exchange were compared with those of the conventional process using ammonia.

It was found that the rate of exchange at −40° C. is ten times higher than for the equivalent ammonia system, while at −60° C. the rate of exchange is thirty times faster.

It is known that the solubility in water of the agent used is about one hundred times smaller than that of ammonia.

Due to the inherent properties of the novel exchange agent used, it is possible to use a range of temperatures which is wider by about 40° C. than that possible in the ammonia system, as the freezing point is about 15° lower, while the critical temperature is about 24° C. higher. As the critical pressure is about 40 atmospheres lower than that of ammonia, it is possible to use a considerably cheaper apparatus due to the possibility of using thinner conduits and vessels.

Example 2

A bi-thermal isotopic exchange apparatus was actuated with dimethyl-amine as exchange agent and with sodium dimethylamide as catalyst. It was found that the reaction proceeded 40 times as fast as with ammonia at a temperature of −40° C. Thus the same apparatus can be used in order to obtain a substantially greater yield per unit time, or the time for obtaining identical quantities of enriched deuterium can be correspondingly shortened.

Example 3

A bi-thermal isotopic exchange apparatus was actuated with ethyl amine as exchange agent and with lithium ethyl amide as catalyst. The exchange took place at a rate at least ten times as fast as with ammonia.

What is claimed is:

1. In a process for the isotopic enrichment of an exchange agent with deuterium by bi-thermal isotopic exchange between a gaseous stream containing hydrogen and a liquid stream containing said exchange agent and a catalyst for stripping deuterium from said gaseous stream, the improvement comprising employing as said exchange agent an aliphatic amine having the formula RR'NH, wherein R is hydrogen or a lower alkyl radical having from 1 to 5 carbon atoms and R' is a lower alkyl radical having from 1 to 5 carbon atoms, and employing as said catalyst an alkali metal amide having the formula MNRR', wherein M is an alkali metal atom and R and R' are as defined above.

2. The process of claim 1, wherein the exchange agent is selected from the group consisting of methylamine, dimethylamine, ethylamine, diethylamine, propylamine, isopropylamine, butylamine and isobutylamine.

3. The process of claim 1, wherein the catalyst is selected from the group consisting of potassium methylamide, potassium dimethylamide, sodium methylamide, sodium diethylamide, lithium methylamide, lithium dimethylamide, potassium ethylamide, potassium diethylamide, sodium ethylamide, sodium diethylamide, lithium ethylamide and lithium diethylamide.

4. The process of claim 1, wherein the isotopic exchange is effected within a range of temperatures varying between the freezing point and the critical temperature of the exchange agent.

5. A process for the isotopic enrichment of an exchange agent with deuterium by bi-thermal isotopic exchange, which comprises:
(a) flowing a gaseous stream containing hydrogen along a path in contact with a liquid stream containing
 (i) an exchange agent constituted of an aliphatic amine having the formula RR'NH, wherein R is hydrogen or a lower alkyl radical having from 1 to 5 carbon atoms and R' is a lower alkyl radical having from 1 to 5 carbon atoms, and
 (ii) a catalyst for stripping deuterium from said gaseous stream, constituted of an alkali metal amide having the formula MNRR', wherein M is an alkali metal atom and R and R' are as defined above;
(b) effecting isotopic deuterium exchange between said streams in at least two temperature stages;
(c) equilibrating the liquid stream with water to recharge the liquid stream with deuterium; and
(d) recycling the thus deuterium-enriched liquid stream for further isotopic deuterium exchange with said gaseous stream.

6. The process of claim 5, wherein the exchange agent is selected from the group consisting of methylamine, dimethylamine, ethylamine, diethylamine, propylamine, isopropylamine, butylamine and isobutylamine.

7. The process of claim 5, wherein the catalyst is selected from the group consisting of potassium methylamide, potassium dimethylamide, sodium methylamide, sodium diethylamide, lithium methylamide, lithium dimethylamide, potassium ethylamide, potassium diethylamide, sodium ethylamide, sodium diethylamide, lithium ethylamide and lithium diethylamide.

8. The process of claim 5, wherein the isotopic exchange is effected within a range of temperatures varying between the freezing point and the critical temperature of the exchange agent.

References Cited

UNITED STATES PATENTS

| | | | |
|---|---|---|---|
| 3,214,243 | 10/1965 | Lazard et al. | 23—210 X |
| 3,233,971 | 2/1966 | Delassus et al. | 23—210 X |

FOREIGN PATENTS

| | | |
|---|---|---|
| 847,584 | 9/1960 | Great Britain. |

OTHER REFERENCES

Chem. Abstracts, 48, Apr.-June 1954, p. 4943.
Chem. Abstracts, 53, Mar.-Apr. 1959, p. 5836.
"Proceedings of the Second United Nations International Conference on the Peaceful Uses of Atomic Energy," vol. 4, pp. 516–519, 1958 edition, United Nations, Geneva.

OSCAR R. VERTIZ, Primary Examiner
EDWARD STERN, Assistant Examiner

U.S. Cl. X.R.

23—210, 211